US011831992B2

(12) United States Patent
Luo et al.

(10) Patent No.: US 11,831,992 B2
(45) Date of Patent: Nov. 28, 2023

(54) CONTROL CIRCUIT AND CONTROL METHOD OF IMAGE SENSOR

(71) Applicant: SigmaStar Technology Ltd., Xiamen (CN)

(72) Inventors: Si-Da Luo, Shenzhen (CN); Wei-Lan Zhong, Shenzhen (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 0 days.

(21) Appl. No.: 17/877,110

(22) Filed: Jul. 29, 2022

(65) Prior Publication Data

US 2023/0077497 A1 Mar. 16, 2023

(30) Foreign Application Priority Data

Sep. 13, 2021 (CN) .......................... 202111077427.8

(51) Int. Cl.
*H04N 23/72* (2023.01)
(52) U.S. Cl.
CPC .................................. *H04N 23/72* (2023.01)

(58) Field of Classification Search
CPC ........ H04N 23/72; H04N 23/71; H04N 23/73; H04N 23/76; H04N 23/60; G05F 1/56
See application file for complete search history.

(56) References Cited

U.S. PATENT DOCUMENTS

| 2012/0081579 A1* | 4/2012 | Doepke | H04N 9/68 348/222.1 |
| 2018/0359410 A1* | 12/2018 | Ain-Kedem | G06T 1/20 |

FOREIGN PATENT DOCUMENTS

CN          105376490 A  *  3/2016

* cited by examiner

*Primary Examiner* — Ahmed A Berhan
(74) *Attorney, Agent, or Firm* — WPAT, P.C.

(57) ABSTRACT

A control circuit and a control method of an image sensor are provided. The image sensor generates a sensed data. The control circuit includes a statistical circuit, an auto exposure (AE) circuit, and a calculation circuit. The statistical circuit generates a luminance statistical data according to the sensed data. The AE circuit sets the image sensor and outputs an AE data which includes a target luminance of the image sensor. The calculation circuit controls an operation mode of the image sensor according to the luminance statistical data and the AE data.

15 Claims, 7 Drawing Sheets

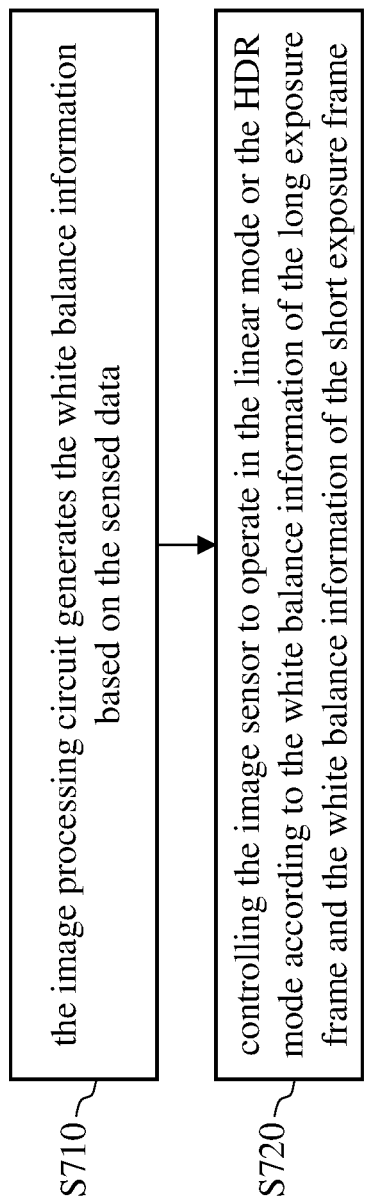

CONTROL CIRCUIT AND CONTROL METHOD OF IMAGE SENSOR

BACKGROUND OF THE INVENTION

1. Field of the Invention

The present invention generally relates to image sensors, and, more particularly, to control circuits and control methods for controlling the image sensors.

2. Description of Related Art

Image sensors, such as surveillance and/or security-dedicated image sensors, can operate in a linear mode or a high dynamic range imaging (HDR) mode, and the switching of the modes is either manually, or automatically through the light-sensitive or soft light-sensitive algorithm according to the luminance of the scenes. However, the manual switching is not practical, whereas the automatic switching is limited due to the poor scene adaptation of the current soft light-sensitive algorithm that relies solely on the luminance.

SUMMARY OF THE INVENTION

In view of the issues of the prior art, an object of the present invention is to provide control circuits and control methods for controlling image sensors, so as to make an improvement to the prior art.

According to one aspect of the present invention, a control circuit for controlling an image sensor that generates a sensed data is provided. The control circuit includes a statistical circuit, an auto exposure (AE) circuit, and a calculation circuit. The statistical circuit is configured to generate a luminance statistical data according to the sensed data. The AE circuit is configured to set the image sensor and output an AE data which includes a target luminance of the image sensor. The calculation circuit is configured to control an operation mode of the image sensor according to the luminance statistical data and the AE data.

According to another aspect of the present invention, a method of controlling an image sensor that generates a sensed data is provided. The method includes the following steps: generating a luminance statistical data according to the sensed data; receiving an AE data that includes a luminance gain; and controlling an operation mode of the image sensor according to the luminance statistical data and the AE data.

According to still another aspect of the present invention, a control circuit for controlling an image sensor that generates a sensed data is provided. The control circuit includes a statistical circuit and a calculation circuit. The statistical circuit is configured to generate a luminance statistical data according to the sensed data. The calculation circuit is configured to execute program codes or program instructions to perform following steps: (A) determining whether a distribution range of the luminance statistical data is less than a first luminance threshold or greater than a second luminance threshold; and (B) controlling the image sensor to operate in a linear mode when a result of step (A) is affirmative. In the linear mode, the image sensor outputs a linear sensed data.

According to the present invention, the control circuits and control methods for controlling image sensors can automatically switch the operation mode of the image sensors. In comparison with the prior art, the control circuits and control methods of the present invention can control the image sensors to operate more automatically, which makes the image sensors more practical.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 7 illustrates a flowchart of a method of controlling image sensors according to another embodiment of the present invention.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes control circuits and control methods for controlling image sensors. On account of that some or all elements of the control circuits could be known, the detail of such elements is omitted provided that such detail has little to do with the features of this disclosure, and that this omission nowhere dissatisfies the specification and enablement requirements. Some or all of the processes of the control methods may be implemented by software and/or firmware and can be performed by the control circuits or their equivalent. A person having ordinary skill in the art can choose components or steps equivalent to those described in this specification to carry out the present invention, which means that the scope of this invention is not limited to the embodiments in the specification.

Figure 1:
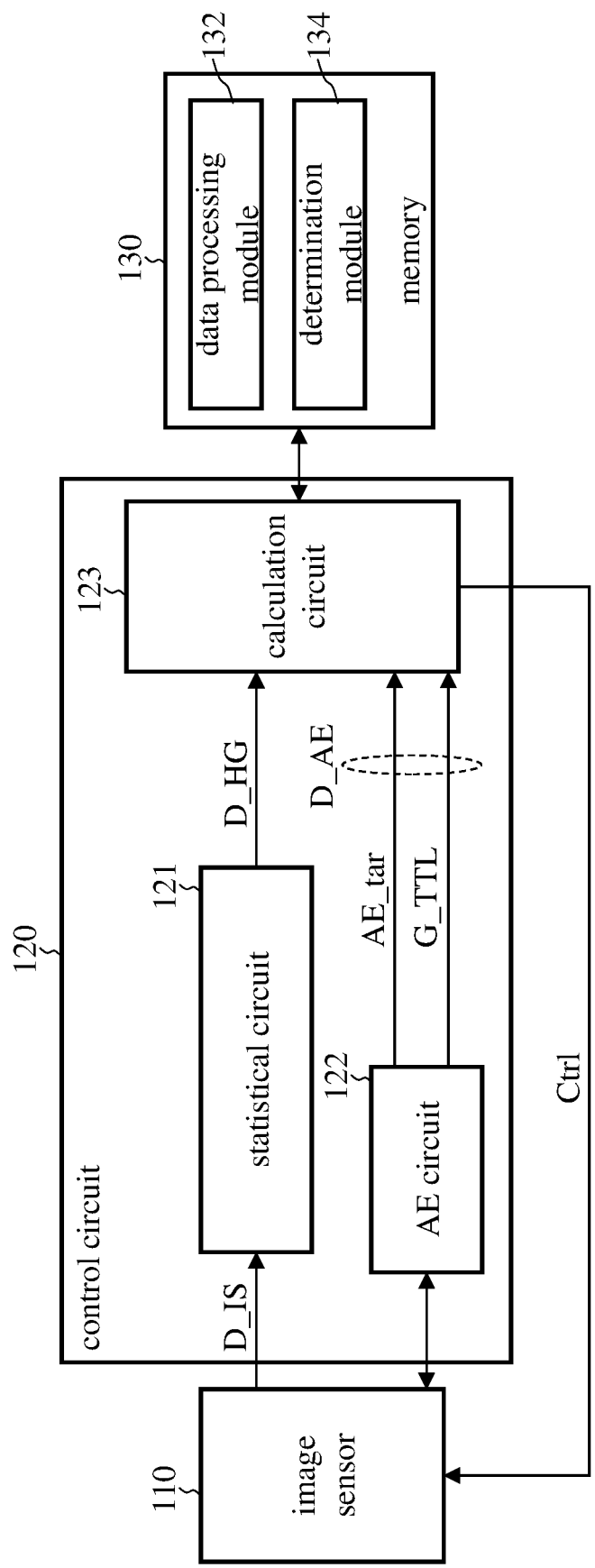
FIG. 1 illustrates a functional block diagram of a control circuit for controlling image sensors according to an embodiment of the present invention.

FIG. 1 is a functional block diagram of a control circuit for controlling image sensors according to an embodiment of the present invention. The image sensor 110 senses its environment to generate the sensed data D_IS. The control circuit 120 is configured to control the image sensor 110. The control circuit 120 includes a statistical circuit 121, an auto exposure (AE) circuit 122, and a calculation circuit 123. The statistical circuit 121 generates the luminance statistical data D_HG according to the sensed data D_IS. The AE circuit 122 determines the target luminance AE_tar of the image sensor 110 by setting the luminance gain G_TTL and the shutter of the image sensor 110. The AE circuit 122 outputs the AE data D_AE to the calculation circuit 123, and the AE data D_AE includes the target luminance AE_tar and the luminance gain G_TTL. The control circuit 120 is coupled to the memory 130. The memory 130 stores a plurality of program codes and/or program instructions, and the program codes and/or program instructions can be divided into a data processing module 132 and a determination module 134 in terms of functions. The calculation circuit 123 controls the image sensor 110 by executing the program codes and/or program instructions.

Figure 2:
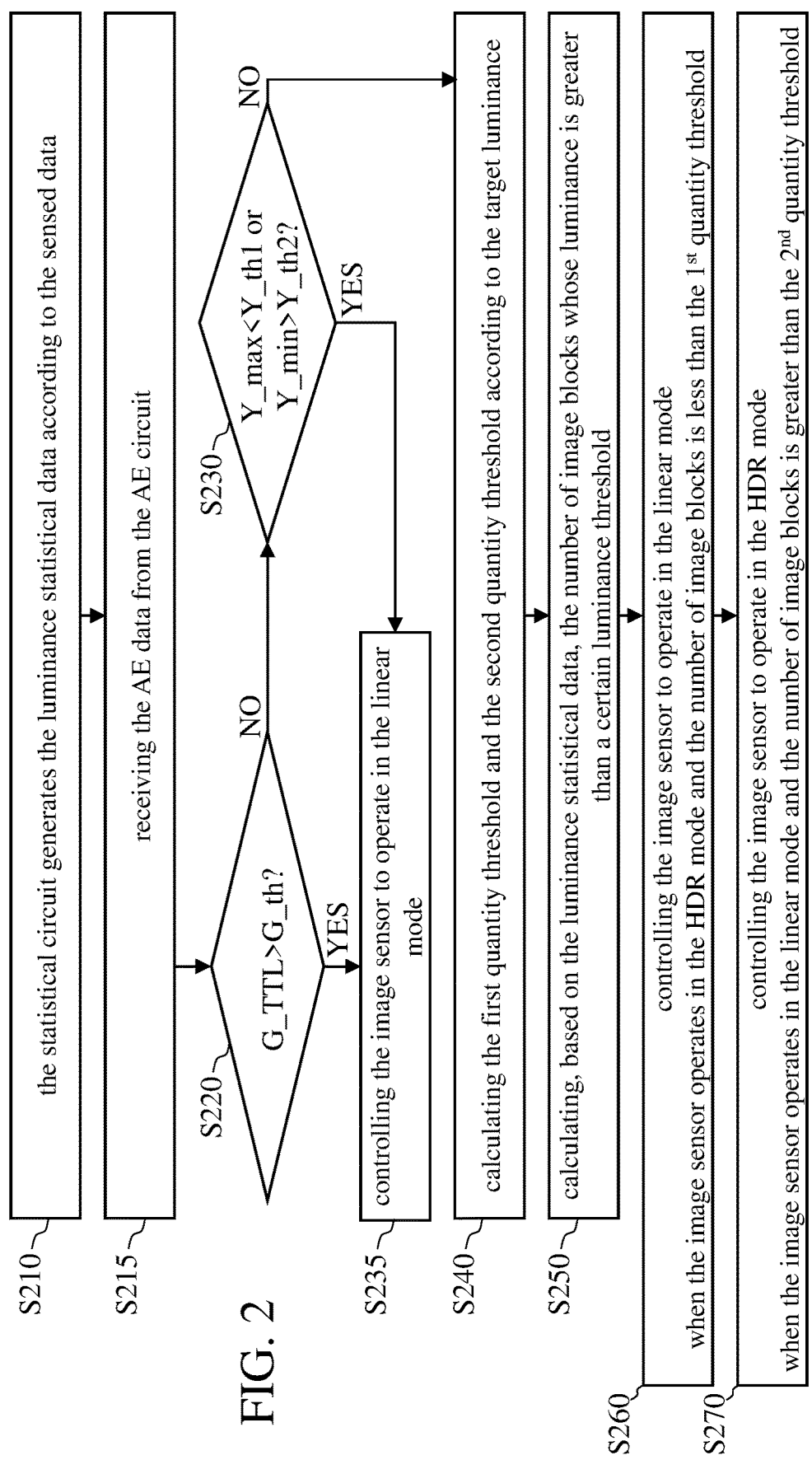
FIG. 2 illustrates a flowchart of a control method of controlling image sensors according to an embodiment of the present invention.

FIG. 2 is a flowchart of the control method of controlling the image sensor 110 according to an embodiment of the present invention. The method includes the following steps.

Step S210: The statistical circuit 121 generates the luminance statistical data D_HG according to the sensed data D_IS. In some embodiments, the sensed data D_IS is the raw data of the Bayer pattern. The statistical circuit 121 divides the raw data into multiple blocks, each of which includes at least one pixel and has a corresponding luminance value (e.g., the average luminance of all pixels in the block). The statistical circuit 121 compiles statistics on the raw data to obtain a histogram of the raw data (i.e., the luminance statistical data D_HG). In some embodiments, the horizontal axis of the histogram is the luminance (e.g., have a range of 0 to 255 when the luminance of the sensed data D_IS is represented by eight bits), and the vertical axis of the histogram is the number of blocks. In some embodiments, the statistical circuit 121 reduces the amount of data (i.e., to save memory usage) by dividing the luminance on the horizontal axis into multiple groups (e.g., 128 groups with each group containing two luminance values, or 64 groups with each group containing four luminance values).

Step S215: the calculation circuit 123 receives the AE data D_AE from the AE circuit 122. The AE data D_AE includes the target luminance AE_tar and the luminance gain G_TTL.

Step S220: The calculation circuit 123 determines whether the luminance gain G_TTL is greater than the gain threshold G_th. The low luminance gain G_TTL (e.g., less than the gain threshold G_th) indicates that the current scene is a high-illumination scene, while the high luminance gain G_TTL (e.g., greater than or equal to the gain threshold G_th) indicates that the current scene is a low-illumination scene. In some embodiments, the gain threshold G_th is a preset empirical value. When the current scene is a low-illumination scene (i.e., the result of step S220 is YES), the calculation circuit 123 controls, through the control signal Ctrl, the image sensor 110 to operate in the linear mode (step S235). When the current scene is not a low-illumination scene (i.e., the result of step S220 is NO), the calculation circuit 123 performs step S230.

Step S230: The calculation circuit 123 determines, according to the luminance statistical data D_HG, whether the maximum luminance Y_max of the raw data is less than the first luminance threshold Y_th1, or whether the minimum luminance Y_min of the raw data is greater than the second luminance threshold Y_th2. Step S230 is equivalent to determining whether the distribution range of the luminance of the raw data exceeds a predetermined range, and the first luminance threshold Y_th1 and the second luminance threshold Y_th2 are the upper and lower boundaries of the predetermined range, respectively. Y_max<Y_th1 or Y_min>Y_th2 indicates that the current scene is a low dynamic scene. When the current scene is a low dynamic scene (i.e., the result of step S230 is YES), the calculation circuit 123 controls, through the control signal Ctrl, the image sensor 110 to operate in the linear mode (step S235). When the current scene is not a low dynamic scene (i.e., the result of step S230 is NO), the calculation circuit 123 performs step S240. The first luminance threshold Y_th1 is greater than the second luminance threshold Y_th2, for example, Y_th1=220 and Y_th2=64 for the cases where the luminance of the sensed data D_IS is an 8-bit value. Note that this is intended to illustrate the invention by way of examples, rather than to limit the scope of the claimed invention.

When the image sensor 110 operates in the HDR mode, the calculation circuit 123 uses the long exposure frame to carry out the above comparison(s) in step S230.

In some embodiments, step S220 and step S230 are interchangeable.

Step S235: The calculation circuit 123 controls, through the control signal Ctrl, the image sensor 110 to operate in the linear mode.

Step S240: the calculation circuit 123 calculates the first quantity threshold Coef1 and the second quantity threshold Coef2 according to the target luminance AE_tar of the image sensor 110. The first quantity threshold Coef1 is less than or equal to the second quantity threshold Coef2. In some embodiments, the first quantity threshold Coef1=1.3868*AE_tar−165.43, and the second quantity threshold Coef2=Coef1+wincoef, where wincoef is a buffer value which is used to prevent the image sensor 110 from repeatedly switching between the linear mode and the HDR mode in a short period of time. In some embodiments, the buffer value wincoef=B*r, where the number of blocks B is the number of blocks obtained in step S210, and the range of the ratio r is 0≤r<1 (e.g., r=3%).

Step S250: The calculation circuit 123 calculates, based on the luminance statistical data D_HG, the number of image blocks SUM whose luminance is greater than the third luminance threshold Y_th3. In some embodiments, the third luminance threshold Y_th3 may be, for example but not limited to, 240 for the cases where the luminance of the sensed data D_IS is an 8-bit value.

Step S260: When the image sensor 110 operates in the HDR mode and the number of image blocks SUM is less than the first quantity threshold Coef1, the calculation circuit 123 controls the image sensor 110 to operate in the linear mode. The number of image blocks SUM being less than the first quantity threshold Coef1 indicates that the current scene is a scene with fewer high-illumination blocks.

Step S270: When the image sensor 110 operates in the linear mode and the number of image blocks SUM is greater than or equal to the second quantity threshold Coef2, the calculation circuit 123 controls the image sensor 110 to operate in the HDR mode. The number of image blocks SUM being greater than or equal to the second quantity threshold Coef2 indicates that the current scene is a scene with more high-illumination blocks.

Figure 3:
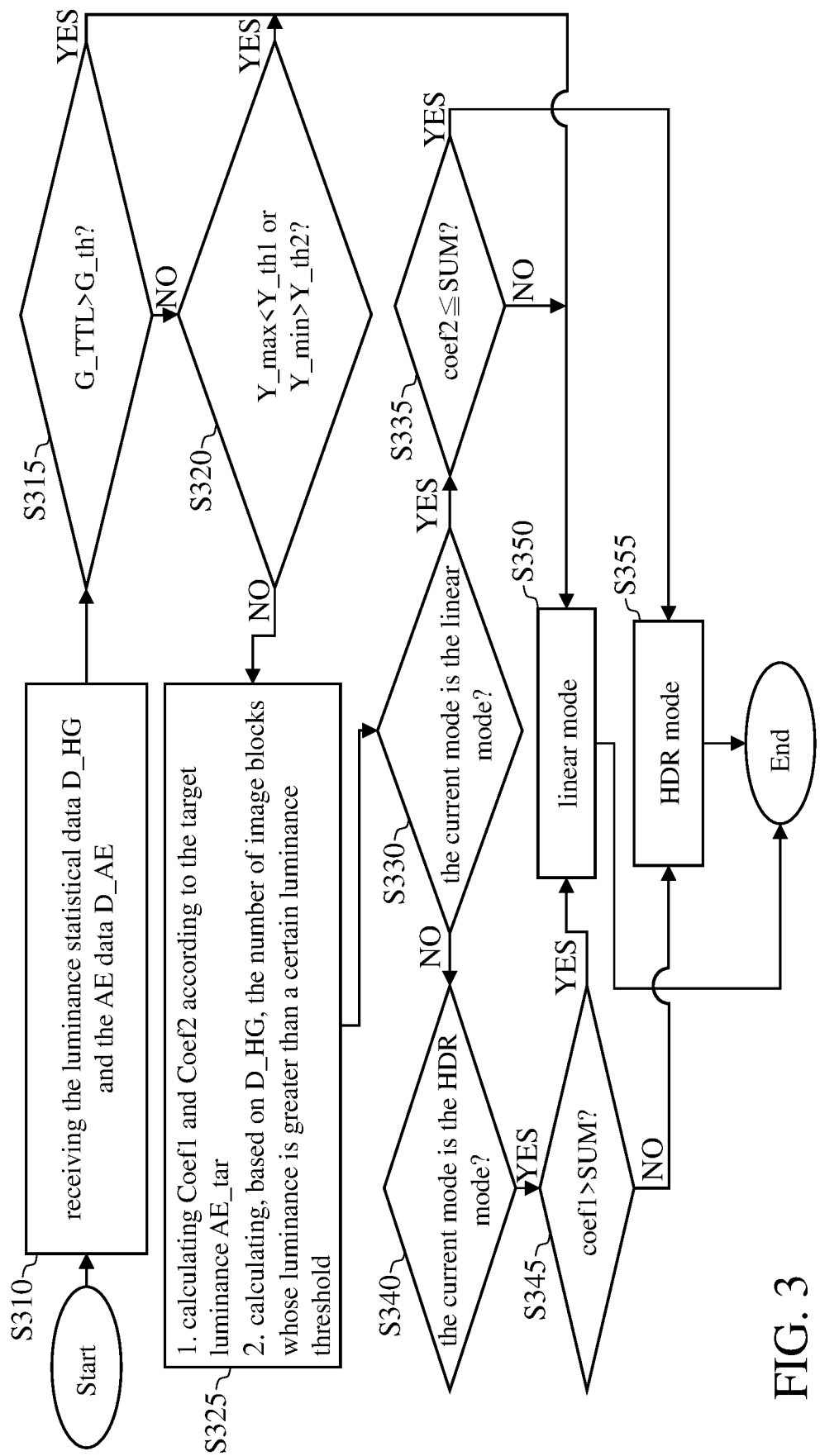
FIG. 3 illustrates a flowchart of a control method of controlling image sensors according to another embodiment of the present invention.

FIG. 3 is a flowchart of the method of controlling the image sensor 110 according to another embodiment of the present invention. The method includes the following steps.

Step S310: The calculation circuit 123 receives the luminance statistical data D_HG from the statistical circuit 121 and the AE data D_AE from the AE circuit 122. Step S310 corresponds to step S210 and step S215 in FIG. 2, and the details are omitted herein for brevity.

Step S315: The calculation circuit 123 determines whether the luminance gain G_TTL is greater than the gain threshold G_th. Step S315 corresponds to step S220 in FIG. 2, and the details are omitted herein for brevity. If the result of step S315 is YES, the calculation circuit 123 performs step S350; if the result of step S315 is NO, the calculation circuit 123 performs step S320.

Step S320: The calculation circuit 123 determines, according to the luminance statistical data D_HG, whether the maximum luminance Y_max of the raw data is less than the first luminance threshold Y_th1, or whether the minimum luminance Y_min of the raw data is greater than the second luminance threshold Y_th2. Step S320 corresponds to step S230 in FIG. 2, and the details are omitted herein for brevity. If the result of step S320 is YES, the calculation circuit 123 performs step S350; if the result of step S320 is NO, the calculation circuit 123 performs step S325.

Step S325: The calculation circuit 123 calculates the first quantity threshold Coef1 and the second quantity threshold Coef2 according to the target luminance AE_tar, and calculates, based on the luminance statistical data D_HG, the number of image blocks SUM whose luminance is greater than the third luminance threshold Y_th3. Step S325 corresponds to step S240 and step S250 in FIG. 2, and the details are omitted herein for brevity.

Step S330: The calculation circuit 123 determines whether the current mode of the image sensor 110 is the linear mode. In some embodiments, the calculation circuit 123 learns the current mode of the image sensor 110 from the AE circuit 122. In some embodiments, the calculation circuit 123 learns the current mode of the image sensor 110 from the previous control signal Ctrl. If the result of step S330 is YES, the calculation circuit 123 performs step S335; if the result of step S330 is NO, the calculation circuit 123 performs step S340.

Step S335: The calculation circuit 123 determines whether the number of image blocks SUM is greater than or equal to the second quantity threshold Coef2. If the result of step S335 is YES, the calculation circuit 123 performs step S355; if the result of step S335 is NO, the calculation circuit 123 performs step S350.

Step S340: The calculation circuit 123 determines whether the current mode of the image sensor 110 is the HDR mode. If the result of step S340 is YES, the calculation circuit 123 performs step S345.

Step S345: The calculation circuit 123 determines whether the number of image blocks SUM is less than the first quantity threshold Coef1. If the result of step S345 is YES, the calculation circuit 123 performs step S350; if the result of step S345 is NO, the calculation circuit 123 performs step S355.

Step S350: The calculation circuit 123 controls, through the control signal Ctrl, the image sensor 110 to operate in the linear mode.

Step S355: The calculation circuit 123 controls, through the control signal Ctrl, the image sensor 110 to operate in the HDR mode.

Steps S310 and S325 in FIG. 3 are performed by the data processing module 132, while steps S315, S320, S330, S335, S340 and S345 are performed by the determination module 134.

Figure 4:
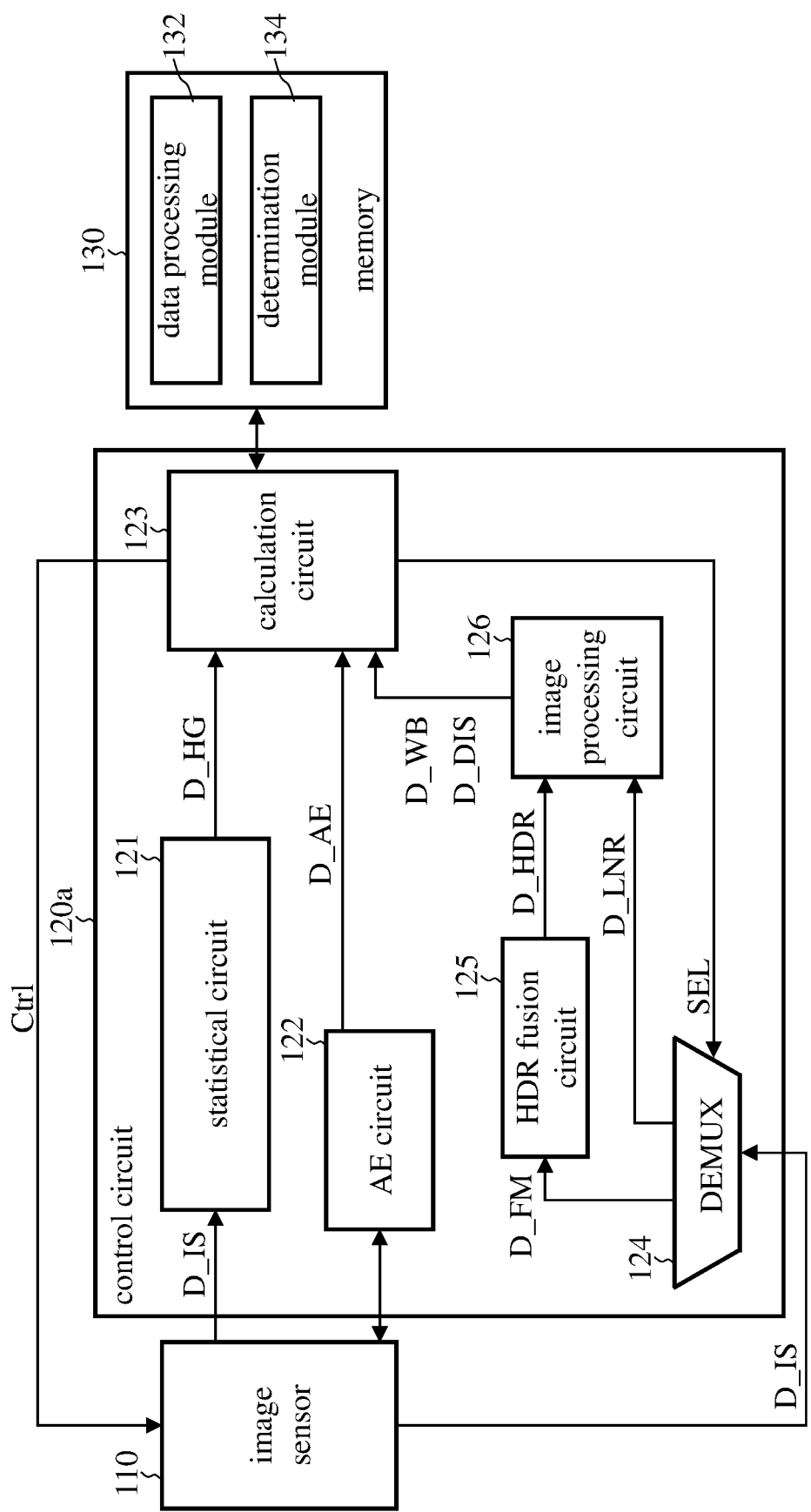
FIG. 4 illustrates a functional block diagram of a control circuit for controlling image sensors according to another embodiment of the present invention.

FIG. 4 is a functional block diagram of the control circuit for image sensors according to another embodiment of the present invention. The control circuit 120a includes the statistical circuit 121, the AE circuit 122, the calculation circuit 123, a de-multiplexer (DEMUX for short) 124, an HDR fusion circuit 125, and an image processing circuit 126. The DEMUX 124, the HDR fusion circuit 125, and the image processing circuit 126 are coupled to each other.

The DEMUX 124, which is coupled to the image sensor 110, receives the sensed data D_IS from the image sensor 110. When the image sensor 110 operates in the linear mode, the sensed data D_IS includes the linear sensed data D_LNR. When the image sensor 110 operates in the HDR mode, the sensed data D_IS includes multiple frames D_FM that include a long exposure frame and a short exposure frame. The calculation circuit 123 controls, through the selection signal SEL, the DEMUX 124 to output the sensed data D_IS to one of the HDR fusion circuit 125 and the image processing circuit 126. Specifically, when the image sensor 110 operates in the linear mode, the calculation circuit 123 controls the DEMUX 124 to output the sensed data D_IS to the image processing circuit 126; when the image sensor 110 operates in the HDR mode, the calculation circuit 123 controls the DEMUX 124 to output the sensed data D_IS to the HDR fusion circuit 125.

The HDR fusion circuit 125 is used to fuse the long exposure frame and the short exposure frame to generate the HDR sensed data D_HDR. The image processing circuit 126 is used for processing the linear sensed data D_LNR and the HDR sensed data D_HDR. The process of fusing the long exposure frame and the short exposure frame is well known to people having ordinary skill in the art, and the details are thus omitted for brevity.

The image processing circuit 126 includes multiple functional modules. In some embodiments, the image processing circuit further includes an HDR fusion circuit, as shown in FIG. 5.

Figure 5:
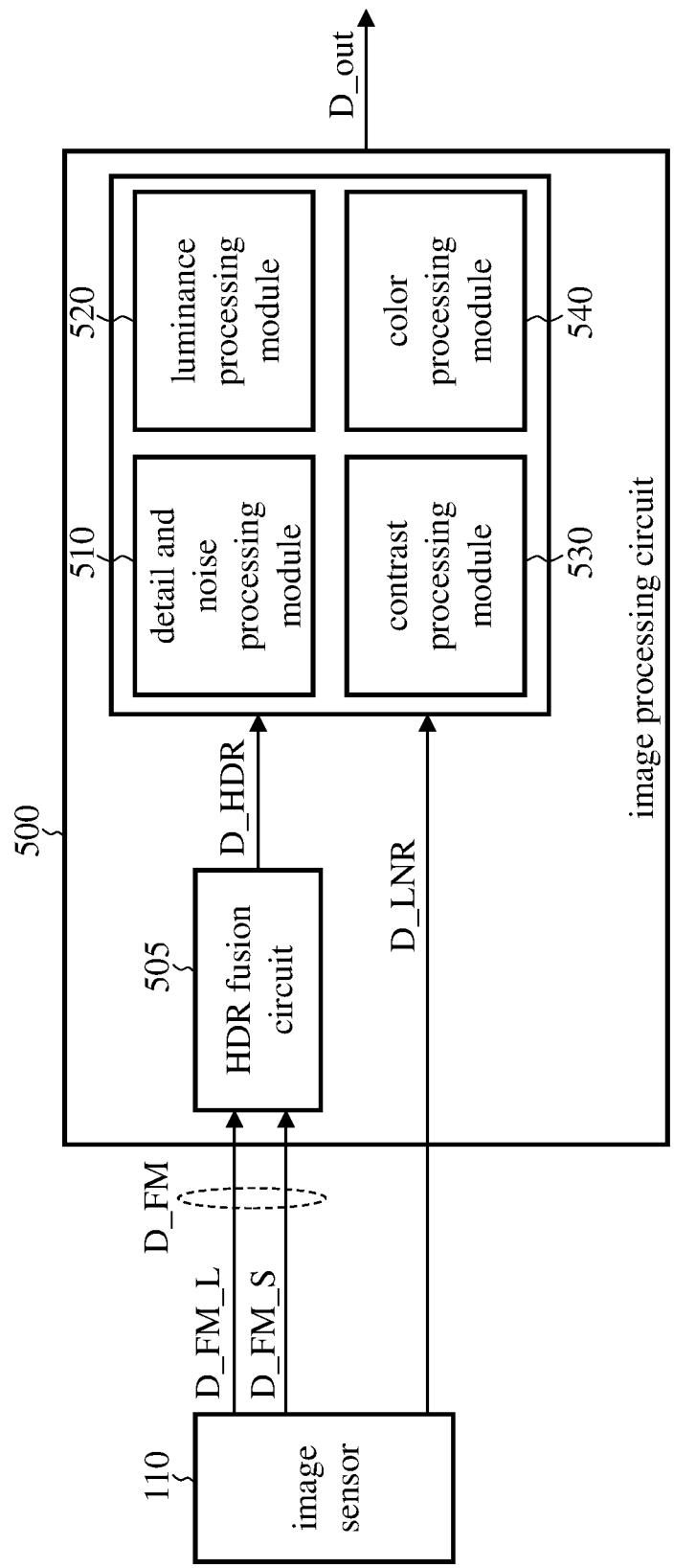
FIG. 5 illustrates a functional block diagram of an image processing circuit according to an embodiment of the present invention.

FIG. 5 is a functional block diagram of an image processing circuit according to an embodiment of the present invention. The image sensor 110 outputs the linear sensed data D_LNR (linear mode) or the frame D_FM (HDR mode). The image processing circuit 500 includes an HDR fusion circuit 505, a detail and noise processing module 510, a luminance processing module 520, a contrast processing module 530, and a color processing module 540. The HDR fusion circuit 505 fuses the long exposure frame D_FM_L and the short exposure frame D_FM_S to generate the HDR sensed data D_HDR. The detail and noise processing module 510 processes the noises and details of the HDR sensed data D_HDR or the linear sensed data D_LNR, such as the 2D (spatial domain) noise processing, 3D (temporal domain) de-noise processing, and sharpness processing, etc. The luminance processing module 520 processes the luminance of the HDR sensed data D_HDR or the linear sensed data D_LNR, such as the luminance adjustments that may include auto exposure, wide dynamic range (WDR), etc. The contrast processing module 530 processes the contrast of the HDR sensed data D_HDR or the linear sensed data D_LNR, such as the adjustment of the gamma value. The color processing module 540 processes the color of the HDR sensed data D_HDR or the linear sensed data D_LNR, such as the color adjustments that may include auto white balance (AWB), color correction matrix (CCM), etc. After performing the image processing discussed above on the HDR sensed data D_HDR or the linear sensed data D_LNR, the image processing circuit 500 generates an output signal D_out. In some embodiments, the output signal D_out includes the bright area block distribution information D_DIS and/or the white balance information D_WB.

Figure 6:
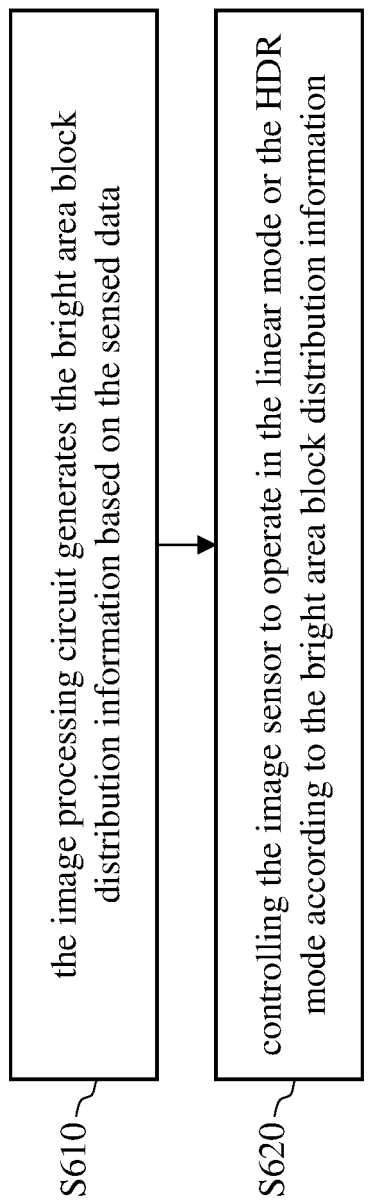
FIG. 6 illustrates a flowchart of a method of controlling image sensors according to another embodiment of the present invention.

FIG. 6 is a flowchart of the method of controlling the image sensor 110 according to another embodiment of the present invention. The method includes the following steps.

Step S610: The luminance processing module 520 of the image processing circuit 126 generates the bright area block distribution information D_DIS based on the sensed data D_IS. The bright area block distribution information D_DIS is indicative of the luminance information of each block of the current picture which, for example, is equally divided into 100*100 blocks. For example, the distribution of the bright area blocks is subject to the light source (point light source, fluorescent light, or others) in the scene and whether the image sensor is facing a window.

Step S620: The calculation circuit 123 controls the operation mode of the image sensor 110 according to the bright area block distribution information D_DIS. For example, a long bright area with a luminance greater than 250 is determined to be a fluorescent lamp, and a circular bright area with a luminance greater than 250 is determined to be a point light source. When the bright area block distribution information D_DIS indicates that the distribution of the bright area blocks may correspond to a fluorescent light source (i.e., it is likely that the image sensor 110 is installed indoors), the calculation circuit 123 controls the image sensor 110 to operate in the linear mode to avoid flicker. A square bright area with a luminance greater than 250 is determined to be the scene where the image sensor 110 is facing the window. When the bright area block distribution information D_DIS indicates that the distribution of the bright area blocks may correspond to the window (i.e., it is likely that the image sensor 110 is capturing a scene through the window), the calculation circuit 123 controls the image sensor 110 to operate in the HDR mode so as to obtain a clearer image.

FIG. 7 is a flowchart of the method of controlling the image sensor 110 according to another embodiment of the present invention. The method includes the following steps.

Step S710: The color processing module 540 of the image processing circuit 126 generates the white balance information D_WB based on the sensed data DIS.

Step S720: The calculation circuit 123 controls the operation mode of the image sensor 110 according to the white balance information D_WB of the long exposure frame D_FM_L and the white balance information D_WB of the short exposure frame D_FM_S. For example, when the image sensor 110 is installed indoors but capturing a scene outside the window, the difference between the white balance information D_WB of the long exposure frame D_FM_L and the white balance information D_WB of the short exposure frame D_FM_S is relatively large; when the image sensor 110 is installed indoors and capturing an indoor scene, the difference between the white balance information D_WB of the long exposure frame D_FM_L and the white balance information D_WB of the short exposure frame D_FM_S is relatively small. When the calculation circuit 123 learns from the white balance information D_WB that the image sensor 110 is capturing the scene outside the window, the calculation circuit 123 controls the image sensor 110 to operate in the HDR mode; when the calculation circuit 123 learns from the white balance information D_WB that the image sensor 110 is capturing the indoor scene, the calculation circuit 123 controls the image sensor 110 to operate in the linear mode.

The steps of FIGS. 6 and 7 can be used as the auxiliary steps for the method of FIG. 2 or FIG. 3 to help exclude some exceptional cases. In some embodiments, the steps of FIGS. 6 and 7 may be arranged between step S335 and/or step S345 and step S350 and/or step S355 in FIG. 3.

The calculation circuit 123 may be a circuit or electronic component with program execution capability, such as a central processing unit (CPU), microprocessor, micro-controller, micro-processing unit, digital signal processor (DSP), or their equivalents. The calculation circuit 123 executes the program codes or program instructions stored in the memory 130 to perform the steps in FIGS. 2 to 3 and FIGS. 6 to 7. In other embodiments, people having ordinary skill in the art can design the calculation circuit 123 according to the above disclosure, that is, the calculation circuit 123 can be an application specific integrated circuit (ASIC) or implemented by circuits or hardware such as a programmable logic device (PLD).

To sum up, the present invention can prevent the image sensor from operating in the linear mode in the high dynamic range scenes, so as to avoid the overexposure of the high luminance area. In addition, under the control of the present invention, the image sensor is self-adaptive in a way that it adaptively switches to the linear mode in the low dynamic range scenes and to the HDR mode in the high dynamic range scenes. As a result, the image sensor is more adaptive to the environment.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A control circuit for controlling an image sensor that generates a sensed data, comprising:
   a statistical circuit configured to generate a luminance statistical data according to the sensed data;
   an auto exposure (AE) circuit configured to set the image sensor and output an AE data; and
   a calculation circuit configured to control an operation mode of the image sensor according to the luminance statistical data and the AE data;
   wherein the AE data comprises a target luminance of the image sensor, and the calculation circuit executes program codes or program instructions to perform following steps:
      calculating a first quantity threshold and a second quantity threshold according to the target luminance, wherein the first quantity threshold is less than or equal to the second quantity threshold;
      calculating, based on the luminance statistical data, a number of image blocks whose luminance is greater than a luminance threshold;
      controlling the image sensor to operate in a second mode when the image sensor operates in a first mode and the number of image blocks is less than the first quantity threshold; and
      controlling the image sensor to operate in the first mode when the image sensor operates in the second mode and the number of image blocks is greater than or equal to the second quantity threshold.

2. The control circuit of claim 1, wherein the first mode is a high dynamic range imaging (HDR) mode, and the second mode is a linear mode.

3. The control circuit of claim 2, wherein the image sensor generates a long exposure frame and a short exposure frame in the HDR mode and generates a linear sensed data in the linear mode, the control circuit further comprising:
   an HDR fusion circuit configured to fuse the long exposure frame and the short exposure frame to generate an HDR sensed data;
   an image processing circuit configured to process the linear sensed data or the HDR sensed data; and
   a de-multiplexer configured to receive the sensed data and output the sensed data to one of the HDR fusion circuit and the image processing circuit according to a selection signal generated by the calculation circuit.

4. The control circuit of claim 1, wherein the control circuit further comprises an image processing circuit that generates bright area block distribution information according to the sensed data, and the calculation circuit further performs following steps:
controlling the operation mode of the image sensor according to the bright area block distribution information.

5. The control circuit of claim 1, wherein the control circuit further comprises an image processing circuit that generates white balance information according to the sensed data, and the calculation circuit further performs following steps:
controlling the operation mode of the image sensor according to the white balance information of a long exposure frame and the white balance information of a short exposure frame.

6. A method of controlling an image sensor that generates a sensed data, comprising:
generating a luminance statistical data according to the sensed data;
receiving an auto exposure (AE) data that comprises a luminance gain;
controlling an operation mode of the image sensor according to the luminance statistical data and the AE data;
generating white balance information; and
controlling the operation mode of the image sensor according to the white balance information of a long exposure frame and the white balance information of a short exposure frame.

7. The method of claim 6, wherein the step of controlling the operation mode of the image sensor according to the luminance statistical data and the AE data comprises:
calculating a first quantity threshold and a second quantity threshold according to a target luminance of the image sensor, wherein the first quantity threshold is less than or equal to the second quantity threshold;
calculating, based on the luminance statistical data, a number of image blocks whose luminance is greater than a luminance threshold;
controlling the image sensor to operate in a second mode when the image sensor operates in a first mode and the number of image blocks is less than the first quantity threshold; and
controlling the image sensor to operate in the first mode when the image sensor operates in the second mode and the number of image blocks is greater than or equal to the second quantity threshold.

8. The method of claim 7, wherein the first mode is a high dynamic range imaging (HDR) mode, and the second mode is a linear mode.

9. The method of claim 6, wherein the step of controlling the operation mode of the image sensor according to the luminance statistical data and the AE data comprises:
determining whether a distribution range of the luminance statistical data is less than a first luminance threshold or greater than a second luminance threshold to generate a determination result; and
controlling the image sensor to operate in a second mode of the operation mode when the determination result is affirmative;
wherein in the second mode, the image sensor outputs a linear sensed data.

10. The method of claim 6 further comprising:
generating bright area block distribution information; and
controlling the operation mode of the image sensor according to the bright area block distribution information.

11. A control circuit for controlling an image sensor that generates a sensed data, comprising:
a statistical circuit configured to generate a luminance statistical data according to the sensed data; and
a calculation circuit configured to execute program codes or program instructions to perform following steps:
(A) determining whether a distribution range of the luminance statistical data is less than a first luminance threshold or greater than a second luminance threshold; and
(B) controlling the image sensor to operate in a linear mode when a result of step (A) is affirmative;
wherein in the linear mode, the image sensor outputs a linear sensed data;
wherein the image sensor generates a long exposure frame and a short exposure frame in a high dynamic range imaging (HDR) mode, the control circuit further comprising:
an HDR fusion circuit configured to fuse the long exposure frame and the short exposure frame to generate an HDR sensed data;
an image processing circuit configured to process the linear sensed data or the HDR sensed data; and
a de-multiplexer configured to receive the sensed data and determine to output the sensed data to one of the HDR fusion circuit and the image processing circuit according to a selection signal generated by the calculation circuit.

12. The control circuit of claim 11 further comprising:
an auto exposure (AE) circuit configured to set the image sensor and output an AE data that comprises a target luminance and a luminance gain of the image sensor;
wherein the calculation circuit further performs following steps:
(C) determining whether the luminance gain is greater than a gain threshold; and
(D) controlling the image sensor to operate in the linear mode when a result of step (C) is affirmative.

13. The control circuit of claim 12, wherein when the result of step (A) and the result of step (C) are both negative, the calculation circuit further performs following steps:
(E) calculating a first quantity threshold and a second quantity threshold according to the target luminance, wherein the first quantity threshold is less than or equal to the second quantity threshold;
(F) calculating, based on the luminance statistical data, a number of image blocks whose luminance is greater than a third luminance threshold;
(G) controlling the image sensor to operate in the linear mode when the image sensor operates in the HDR mode and the number of image blocks is less than the first quantity threshold; and
(H) controlling the image sensor to operate in the HDR mode when the image sensor operates in the linear mode and the number of image blocks is greater than or equal to the second quantity threshold.

14. The control circuit of claim 12, wherein the image processing circuit generates bright area block distribution information according to the sensed data, and the calculation circuit further performs following steps:
(E) controlling the image sensor to operate in one of the HDR mode and the linear mode according to the bright area block distribution information.

15. The control circuit of claim 12, wherein the image processing circuit generates white balance information according to the sensed data, and the calculation circuit further performs following steps:
  (E) controlling the image sensor to operate in one of the HDR mode and the linear mode according to the white balance information of the long exposure frame and the white balance information of the short exposure frame.

\* \* \* \* \*